March 15, 1932.  F. L. MORSE  1,849,684
CHAIN DRIVE MECHANISM
Filed April 12, 1927   2 Sheets-Sheet 1
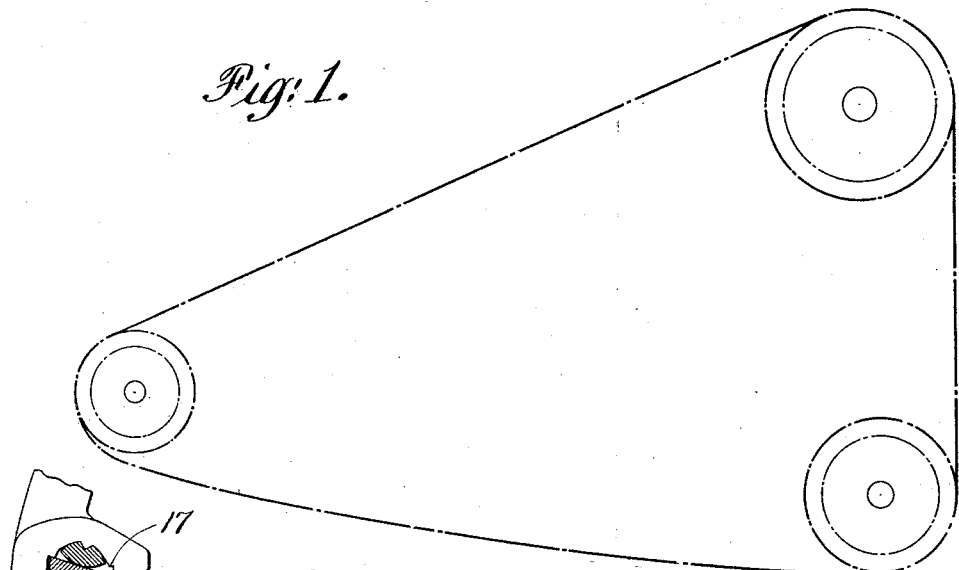
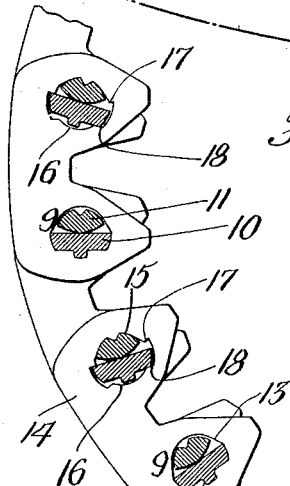
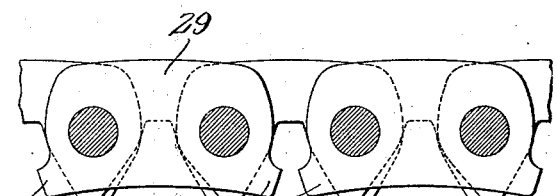
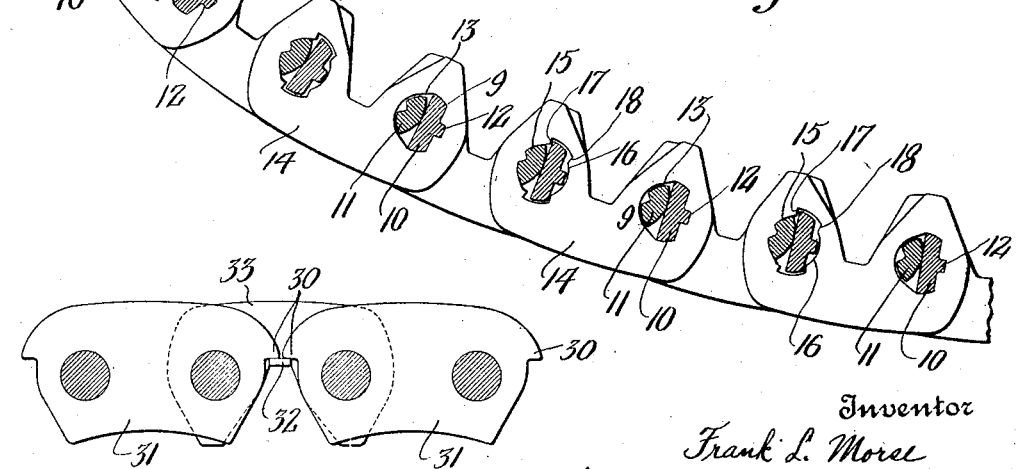
Inventor
Frank L. Morse
By his Attorneys
Synnestvedt & Lechner

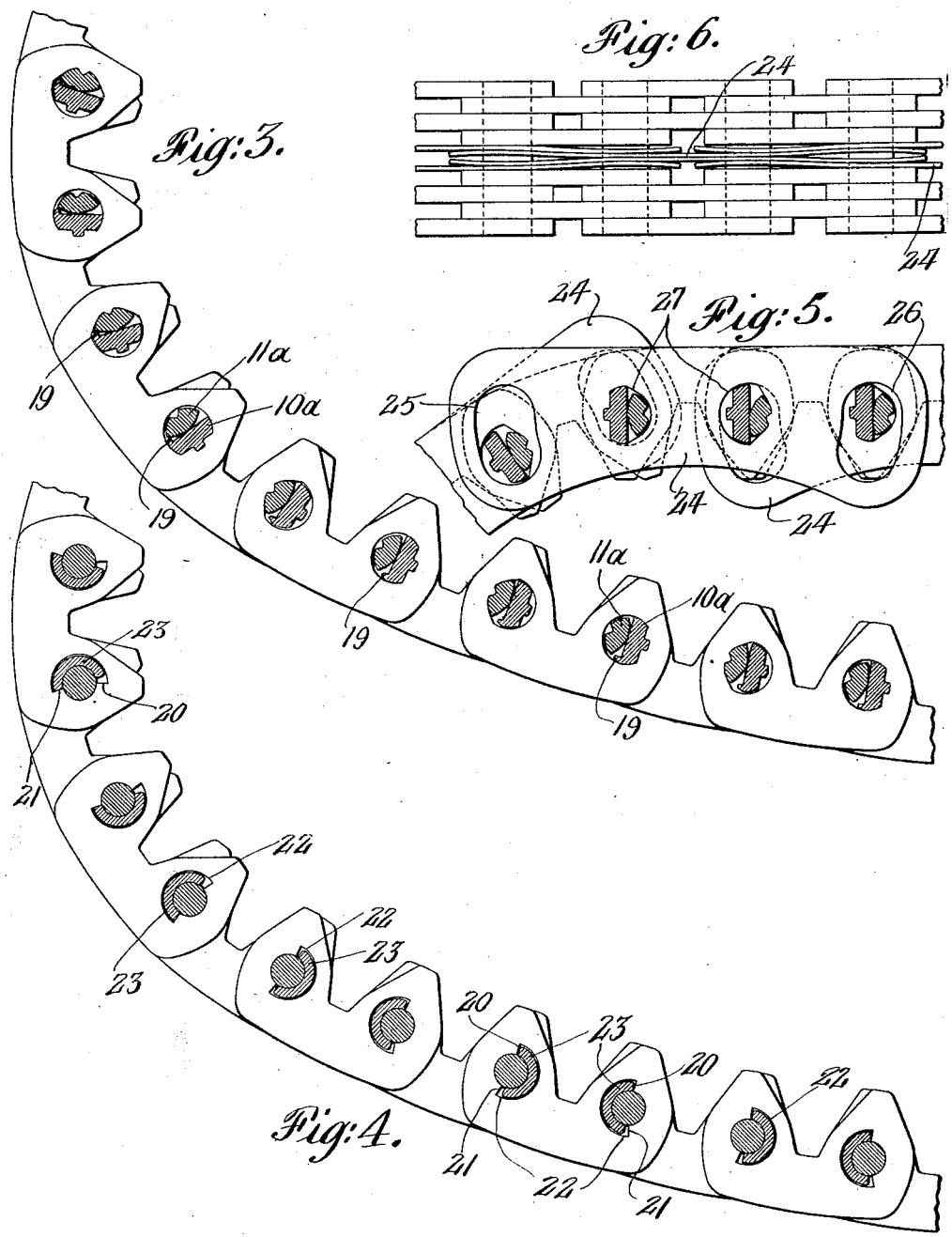

Patented Mar. 15, 1932

1,849,684

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

CHAIN DRIVE MECHANISM

Application filed April 12, 1927. Serial No. 183,033.

This invention relates to chain drive mechanism and more particularly where the chain is of the multiplate type.

The primary object of my invention is the provision of a chain drive mechanism in which certain of the noises now produced are eliminated.

Heretofore it has been the practice in chain drives employing chains having two part pintles to so design the pintle parts that the chain would have a free curvature in the direction the chain takes in passing around the sprocket to a radius smaller than the radius of the smallest sprocket of the drive. I propose to do the opposite of this, that is, I employ a chain the free curvature of which is limited to a radius larger than that of the smallest sprocket of the drive by virtue of which the chain has smooth and gradual contact with such sprocket on the entering side very much after the fashion of the contact between an internal and external gear.

Another object of my invention is the provision of an improved arrangement whereby the chain has limited articulation.

How the foregoing, together with such other objects and advantages as may hereinafter appear, or are incident to my invention, are realized, is illustrated in preferred form in the accompanying drawings, wherein:

Fig. 1 is a diagrammatic layout of a chain drive showing the manner in which the chain enters the smallest sprocket of the drive.

Fig. 2 is a longitudinal section through a piece of chain constructed in accordance with my invention.

Figs. 3 and 4 are views similar to Fig. 2 showing modifications of my invention.

Fig. 5 is a fragmentary longitudinal section of another form of the invention.

Fig. 6 is a plan view of Fig. 5.

Figs. 7 and 8 are still other modifications, the pintles being diagrammatically indicated.

Referring to the drawings, it will be seen that the links of the chain are composed of a plurality of arch-shaped plates adapted to extend over the teeth of sprocket wheels, and a plurality of pintles, the links being arranged in interspersed relation on the pintles.

In Fig. 2 the pintles 9 are of the rocker joint type comprising two parts 10 and 11, the parts 10 being fixed, as indicated at 12, in apertures 13 at one end of every other one of the links 14 crosswise of the chain, and the parts 11 being fixed as indicated at 15 in apertures 16 at the other end of said links. The apertures 13 and 16 are of a configuration as to allow of free movement of the pintle parts 11 and 10 therein respectively as the chain articulates, such movement being limited, as will hereinafter appear. As the links are arranged in interspersed relation on the pintles, it will be seen that as the chain articulates, the parts 10 will move with one set of links and the parts 11 will move with the other set.

It will be noted on inspection of Fig. 2 that I have provided shoulders 17 and 18 in the apertures 16 with which the pintle parts 10 abut as the chain articulates. I so locate the shoulders 17 that the free curvature of the chain in passing over the smallest sprocket of a drive is limited to a radius greater than the radius of the sprocket, by virtue of which the chain enters the sprocket after the manner of internal external gears, thereby ensuring smooth and gradual tooth contact and eliminating noise (see Fig. 1.) In this figure the chain is illustrated as moving in a direction in which the lower strand moves to the left. By free curvature is meant the curvature taken by the chain upon contact of the chain parts as distinguished from the curvature which may be taken under load due to the seating home of the parts. The shoulder 16 limits the amount of back bend of the chain. It will be understood that while the chain approaches the sprocket in the manner just described it leaves the sprocket on a tangent by virtue of the flexing of the chain under load.

It may be desirable, in some instances, to provide the shoulders only in certain of the links transversely of the chain or only in certain of the links throughout the length of the chain according to the particular service to which the chain is to be put.

In Fig. 3 I have shown a modification in which the curvature is limited to the amount hereinbefore mentioned by the particular construction of the pintle parts 10a and 11a. In the particular form illustrated a projection 19 is formed on one of the pintle parts which abuts with the other pintle part.

In the modification shown in Fig. 4 I employ a bush type pintle and restrain the angular motion to accomplish the results above mentioned by means of the particular location of the ledges 20, 21 of the apertures 22 with which the bushes 23 contact, the ledges 20 limiting the amount of back bend and the ledges 21 limiting the amount of bend in the direction of passing around a sprocket.

In the modification illustrated in Figs. 5 and 6 I employ special plates 24 for limiting the amount of bend of the chain in both directions, in this instance the special plates also serving the purpose of acting as guide links running in a groove in the sprocket wheel to prevent lateral displacement of the chain. It will also be observed that in this case the plates 24 are of spring metal for the purpose of exerting lateral pressure on the arch-shaped link plates. The plates 24 are provided with a plurality of apertures for receiving pintles, preferably four, the end apertures 25 and 26 being elongated and the inner apertures 27, 27 being of the same configuration as the apertures of the arch-shaped link plates. The ends of the elongated apertures 25 and 26 serve as abutments engaged by pintles, one end limiting backward bend and the other forward bend. It will be understood that the amount of bend in both directions is determined by the disposition and the length of the apertures 25 and 26. In the event that bend control is desired only in the direction of curvature around a sprocket, the upper end of apertures 25 and 26, as viewed in Fig. 5, may be left open. Links of such construction may be provided either throughout the length of the chain, or at intervals, as best suits the service to which the chain is to be put.

In the modification shown in Fig. 7 I control the amount of bend by means of the abutments 28 provided on the guide links 29 and adapted to abut with one another.

In the form shown in Fig. 8 I have provided abutments 30 on the guide links 31 adapted to abut with the lips 32 struck up at the arched portion of the adjacent links 33. The particular arrangement shown in this figure is for preventing back bend, but it will be understood that bend in the other direction could be limited by providing abutments on the guide links 31 below the lip 32, or control in both directions could be had by having abutments above and below the lip 32, it being understood that the abutments below would be spaced sufficiently away from the lip to permit of the proper amount of articulation of the chain.

While I have shown various embodiments of my invention, it will be understood that these are only by way of illustration and that the invention is susceptible of various modifications and adaptations as will be apparent to those skilled in the art without departing from the scope of the invention as defined in the following claims.

I claim:—

1. A multiplate drive chain having links comprising a plurality of plates interspersed with the plates of adjacent links, guide links, and pintles for connecting said links and guide links, said guide links being provided with abutments with which the pintles contact whereby to limit the amount of bend of the chain in both directions.

2. The combination of a multiplate drive chain having links comprising a plurality of plates interspersed with the plates of adjacent links, guide links, and pintles for connecting said links and guide links, said guide links being provided with abutments with which the pintles contact whereby to limit the amount of bend of the chain in both directions, the limit of free bend in the direction around a sprocket being such that the radius of the curvature is greater than the radius of a sprocket over which the chain is to pass, and such sprocket.

3. The combination of a multiplate drive chain having links comprising a plurality of apertured plates interspersed with apertured plates of adjacent links, two part pintles fitting said apertures for connecting said links, certain apertures being provided with spaced shoulders and certain pintle parts being adapted to engage said shoulders as the links articulate on the pintles, the spacing of the shoulders being such that the limit of free articulation in the direction of passing over a sprocket is such that the pitch curvature of the chain is greater than the pitch of the sprocket over which the chain is to pass, and such sprocket.

4. A multiplate drive chain having links comprising a plurality of plates interspersed with the plates of adjacent links, guide links, and pintles for connecting said links and guide links, said guide links having apertures for more than two pintles with the apertures shaped to permit of limited articulation.

In testimony whereof I have hereunto signed my name.

FRANK L. MORSE.